US008415822B2

(12) United States Patent
Zilberberg et al.

(10) Patent No.: US 8,415,822 B2
(45) Date of Patent: Apr. 9, 2013

(54) POWER BOOSTER FOR CABLE SYSTEMS

(75) Inventors: David Zilberberg, Herut (IL); Moshe Samuel, Rishon Lezion (IL)

(73) Assignee: Hulda Transformers, Mobile Post Eyal (IL)

( * ) Notice: Subject to any disclaimer, the term of this patent is extended or adjusted under 35 U.S.C. 154(b) by 0 days.

(21) Appl. No.: 13/058,128

(22) PCT Filed: Aug. 16, 2009

(86) PCT No.: PCT/IL2009/000805
§ 371 (c)(1),
(2), (4) Date: Feb. 8, 2011

(87) PCT Pub. No.: WO2010/020984
PCT Pub. Date: Feb. 25, 2010

(65) Prior Publication Data
US 2011/0140683 A1    Jun. 16, 2011

(30) Foreign Application Priority Data
Aug. 17, 2008    (IL) .......................................... 193502

(51) Int. Cl.
*H02J 3/00* (2006.01)
(52) U.S. Cl. .......................................................... 307/1
(58) Field of Classification Search ....................... 307/1
See application file for complete search history.

(56) References Cited

U.S. PATENT DOCUMENTS

| 5,747,888 A | 5/1998 | Zilberberg |
| 5,844,327 A | 12/1998 | Batson |
| 5,845,190 A | 12/1998 | Bushue et al. |
| 6,054,905 A | 4/2000 | Gresko |
| 6,836,898 B1 | 12/2004 | Yates et al. |

FOREIGN PATENT DOCUMENTS

| WO | 99/38323 A | 7/1999 |
| WO | 2008/020750 A | 2/2008 |

*Primary Examiner* — Rexford Barnie
*Assistant Examiner* — Dru Parries
(74) *Attorney, Agent, or Firm* — Harness, Dickey & Pierce, P.L.C.

(57) ABSTRACT

Device and method for regulating voltage level at section of telecommunications network, the device including an input port, which receives input RF telecommunications signal with input AC voltage from a network portion, isolating circuitry, which isolates input AC voltage, a transformer, which receives the isolated AC voltage, relays, which provide selected voltage gain by selectively switching on connection from transformer secondary winding, thereby deriving regulated AC voltage at predetermined level, control circuitry, which monitors input AC voltage and selectively activates a selected relay while deactivating other relays to provide selected voltage gain, recombining circuitry, which recombines regulated AC voltage with isolated input RF telecommunications signal, and an output port, which provides recombined regulated AC voltage and RF telecommunications signal to another network portion.

17 Claims, 10 Drawing Sheets

POWER BOOSTER FOR CABLE SYSTEMS

FIELD OF THE INVENTION

The disclosed technique relates to a voltage regulation device for regulating the voltage level in a telecommunications network.

BACKGROUND OF THE INVENTION

A cable television (CATV) network serves to broadcast television (TV) content to home viewers. Many cable TV networks utilize a hybrid fiber-coaxial (HFC) infrastructure, which combines a fiber optic network with a coaxial cable network. The fiber optic network extends from the cable TV headend to regional distribution hubs and to optical nodes, each of which may service up to around 2,000 subscribers. The coaxial cable network extends from the optical node to the subscriber home, via main trunk cables and smaller distribution cables in a tree and branch configuration. The optical node includes an optical signal receiver for converting the optically modulated TV signal originating at the headend into an electrical radio frequency (RF) modulated signal, to be distributed downstream to the subscriber homes via the coaxial cables. The optical node may also transmit information in the reverse path upstream from the subscriber home to the cable TV headend. RF amplifiers are distributed along the trunk and distribution coaxial cables, for overcoming the attenuation and passive losses of the downstream (or upstream) RF signal. The coaxial cable network also carries alternating current (AC) power, which is added to the trunk cable line (usually at 60V or 90V) by a power supply and power inserter, supplying power to the trunk and distribution RF amplifiers. Line extenders (smaller distribution amplifiers) may be used to boost the signals in order to maintain the power at a sufficient level when it reaches the television. A secondary line (or drop) connects the distribution line to the subscriber home through a "tap", which passes the RF signal to the television sets for broadcasting, and supplies the AC power to devices which may require it. An HFC based network may also be used to provide telephone service, Internet access and other services in addition to television content broadcasting.

The network power supply may utilize a voltage stabilizer, such as a ferroresonant transformer, for providing a constant output voltage from the mains power source. The power supply generally provides 60V-90V AC at a frequency of 50/60 Hz. Due to resistance, the voltage level along the coaxial cable lines may drop below the minimum level required for the stable operation of the amplifiers and optical nodes. The standard approach for overcoming this voltage drop involves inserting additional power supplies (or transformers) to the network, to supply the extra power through a sorter coaxial cable. This approach, however, increases the number of network components and utility power connections, thereby substantially increasing the overall cost of the system. The added power supplies are also generally underutilized (serving a limited number of loads and required infrequently), resulting in overall inefficiency and wasted costs.

Reference is now made to FIGS. 1A and 1B. FIG. 1A is a schematic illustration of a hybrid fiber-coaxial (HFC) network infrastructure, generally referenced 10, which is known in the art. FIG. 1B is a schematic illustration of another HFC network infrastructure, generally referenced 60, which is known in the art. HFC network infrastructure 10 includes an optical node 12, a first power source 14, a first power inserter 16, a second power source 18, a second power inserter 20, a plurality of trunk amplifiers 22, 24 and 26, and a plurality of line extenders 28, 30, 32, 34, 36 and 38. Optical node 12 is connected to trunk amplifiers 22, 24 and 26 via coaxial cables 40, 42 and 44, respectively. Trunk amplifier 22 is connected to line extenders 28 and 30 via respective coaxial cables 46 and 48. Trunk amplifier 26 is connected via coaxial cable 50 to line extender 34, which is connected to line extender 32 via coaxial cable 52. Trunk amplifier 26 is connected via coaxial cable 54 to line extender 36, which is connected to line extender 38 via coaxial cable 56. Power source 14 provides power via power inserter 16 through coaxial cable 44, supplying optical node 12, trunk amplifiers 22, 24 and 26, and line extenders 28, 30, 32 and 34 with sufficient power to operate. Second power source 18 reduces the current load on power supply 14, providing sufficient power for line extenders 36 and 38, all of which are distant from first power source 14, thereby compensating for the large voltage drop over coaxial cable 44. Power source 18 provides power via power inserter 20 through coaxial cable 54.

With reference to FIG. 1B, HFC network infrastructure 60 is analogous to HFC network infrastructure 10, except for a third power source 15 connected to coaxial cable 44 via third power inserter 17. Third power source 15 is disposed in proximity to first power source 14, and supplies power to trunk amplifier 26, while first power source 14 supplies power to optical node 12, trunk amplifier 22 and 24, and line extenders 28 and 30, and second power source 18 supplies power to line extenders 32, 34, 36 and 38. The use of two power sources in close proximity is common when the total load power requirement exceeds the power obtainable from a single power source.

U.S. Pat. No. 5,747,888 to Zilberberg, entitled "Back up system for the supply of voltage in television cable systems", is directed to a is back-up system for supplying voltage to main and secondary amplifiers in a cable television network in the case of an electricity fault. Each trunk line in the cable television network includes a switching means (e.g., an AC relay), which is connected (via power inserters) to both a local power supply and a second back-up power supply located near a neighboring trunk amplifier. When an electricity fault occurs, the switching means is automatically activated and electricity is supplied to the trunk amplifiers from the available power supply of a neighboring trunk. A pair of two-way back-up units may be located between a pair of adjacent trunks (e.g., the last two trunks of a cascade) operating in opposite directions to each other. During an electricity fault in one trunk, the two-way back-up unit connected to the adjoining trunk is activated and supplies voltage to the trunk where the fault occurs. When back-up voltage is no longer required, current flow from the back-up unit is terminated.

U.S. Pat. No. 5,844,327 to Batson, entitled "Apparatus and method for optimizing power distributed in a broadband signal system", is directed to a broadband system (e.g., a CATV system) with optimized power distribution. Each fiber/coaxial distribution node includes a power supply and a combiner. The power supply includes an AC distribution panel, input rectifiers, power inverters and a controller. The AC distribution panel provides utility AC power to the rectifiers, where it is converted to a DC voltage, followed by inversion and conditioning by the inverters. The combiner provides the output power, together with broadband signals received from a trunk transceiver, to be distributed through the coaxial cable. The output power supplies power to operate amplifiers and network interface units in the broadband system. The controller monitors control and status information with power supply units in order to detect system operation errors. The power supply may be redundant bus-switched, where the mains, back-up batteries and auxiliary power units are diode isolated from each other and connected to the output via a redundant power bus, allowing continuous operation during failure, removal or maintenance of the rectifier or DC auxiliary source.

U.S. Pat. No. 5,845,190 to Bushue et al, entitled "Cable access device and method", is directed to an access device that supplies combined communication and power signals to respective subscriber equipment facilities over a broadcast distribution network. The access device receives an RF communication signal and an AC power signal from an upstream section of a coaxial distribution cable, and isolates the communication signal from the power signal using a diplexer circuit. The isolated AC power is rectified and applied to a flyback converter controlled by a variable duty cycle control circuit directed by a transistor switch, which periodically connects a primary winding of a transformer to the input voltage, producing a DC output voltage. A load storage capacitor maintains the DC output voltage at a constant level sufficient to withstand momentary drops in the input AC power signal. Control circuitry adjusts the duty cycle of the transistor switch and the transformer switching cycle period, to maintain sufficient output power with a single stage conversion. A second diplexer circuit recombines the output voltage with the communication signal, and the recombined signal is reinserted onto a downstream section of the coaxial distribution cable for transmission.

U.S. Pat. No. 6,836,898 to Yates et al, entitled "Subscriber power module for CATV customer interface equipment", is directed to a user interface apparatus for a CATV system with reduced energy consumption. The user interface apparatus includes an interior unit and an exterior unit disposed at the customer location. The interior unit receives high voltage AC power input (e.g., 110V) from a standard consumer power source, and converts it into a lower AC voltage (e.g., 30-60V). The lower AC voltage is provided to the coaxial cable and used to power electronic equipment in the interior unit and well as other equipment connected to the cable (such as in the exterior unit). The exterior unit receives high voltage AC power from a first coaxial cable (distributed by the CATV network), and low voltage AC power from a second coaxial cable (supplied by the interior unit). An AC power isolator electrically isolates the first coaxial cable from the low voltage AC power while conducting RF signals bidirectionally between the two cables. The isolator also isolates the high voltage AC power from damaging electronic equipment in the unit. The interior or exterior units may include a DC power supply for converting the AC voltage to DC voltages for operating electronic equipment.

SUMMARY OF THE INVENTION

In accordance with one aspect of the disclosed technique, there is thus provided a device for regulating the voltage level at a desired section of a telecommunications network, such as a cable television network. The device includes an input port, isolating circuitry, a transformer, a plurality of relays, control circuitry, recombining circuitry, and an output port. The input port receives an input RF telecommunications signal with an input AC voltage. The isolating circuitry isolates the input AC voltage from the input RF telecommunications signal. The transformer includes a primary winding, which receives the input AC voltage, and a secondary winding. The transformer may be a step-up transformer, where the phase-output of the transformer secondary winding is serially connected to the phase-input of the transformer primary winding. The relays, preferably solid state relays, are connected to respective points of the transformer secondary winding, and provide a selected voltage gain by selectively switching on a connection from the transformer secondary winding, thereby deriving a regulated AC voltage at a predetermined level. The control circuitry monitors the input AC voltage and selectively activates a selected relay while deactivating other relays, to provide the selected voltage gain. The control circuit further prevents a current overload at the output port, by monitoring the output current and selectively increasing the regulated AC voltage. The recombining circuitry recombines the regulated AC voltage with the isolated input RF telecommunications signal to produce a recombined regulated AC voltage and RF telecommunications signal. The output port provides the recombined regulated AC voltage and RF telecommunications signal to another portion of the telecommunications network. The input port or output port may be connected to respective portions of a coaxial cable of the network, or may be connected directly to a network component, such as an optical node or an amplifier.

In accordance with another aspect of the disclosed technique, there is thus provided a method for regulating the voltage level at a desired section of a telecommunications network, such as a cable television network. The method includes the procedures of continuously receiving an input RF telecommunications signal with an input AC voltage from a portion of the network, and isolating the input AC voltage from the input RF telecommunications signal. The method further includes the procedures of deriving a regulated AC voltage at a predetermined level, from the isolated input AC voltage, using a transformer with a plurality of relays, preferably solid state relays, connected to respective portions of the transformer secondary winding, and monitoring the input AC voltage, and selectively activating a selected relay while deactivating the other relays, to provide a selected voltage gain. The method further includes the procedures of recombining the regulated AC voltage with the isolated input RF telecommunications signal to produce a recombined regulated AC voltage and RF telecommunications signal, and providing the recombined regulated AC voltage and RF telecommunications signal to another portion of the telecommunications network.

BRIEF DESCRIPTION OF THE DRAWINGS

The disclosed technique will be understood and appreciated more fully from the following detailed description taken in conjunction with the drawings in which.

DETAILED DESCRIPTION OF THE INVENTION

The disclosed technique overcomes the disadvantages of the prior art by providing a voltage regulation device, which compensates for voltage drops along coaxial cables in a hybrid fiber coaxial (HFC) network by boosting the voltage to a sufficient level to ensure that network components receive sufficient operating power, without having to introduce additional power supplies into the network. The voltage regulation device includes a transformer connected with a plurality of solid state relays (SSRs) which are selectively activated to provide a desired voltage gain. A control circuit monitors the input voltage level and selectively switches on one SSR while maintaining the other SSRs switched off, with precise synchronization of the switching between the SSRs, thereby producing a stable continuous output voltage at the desired voltage level.

Figure 2:
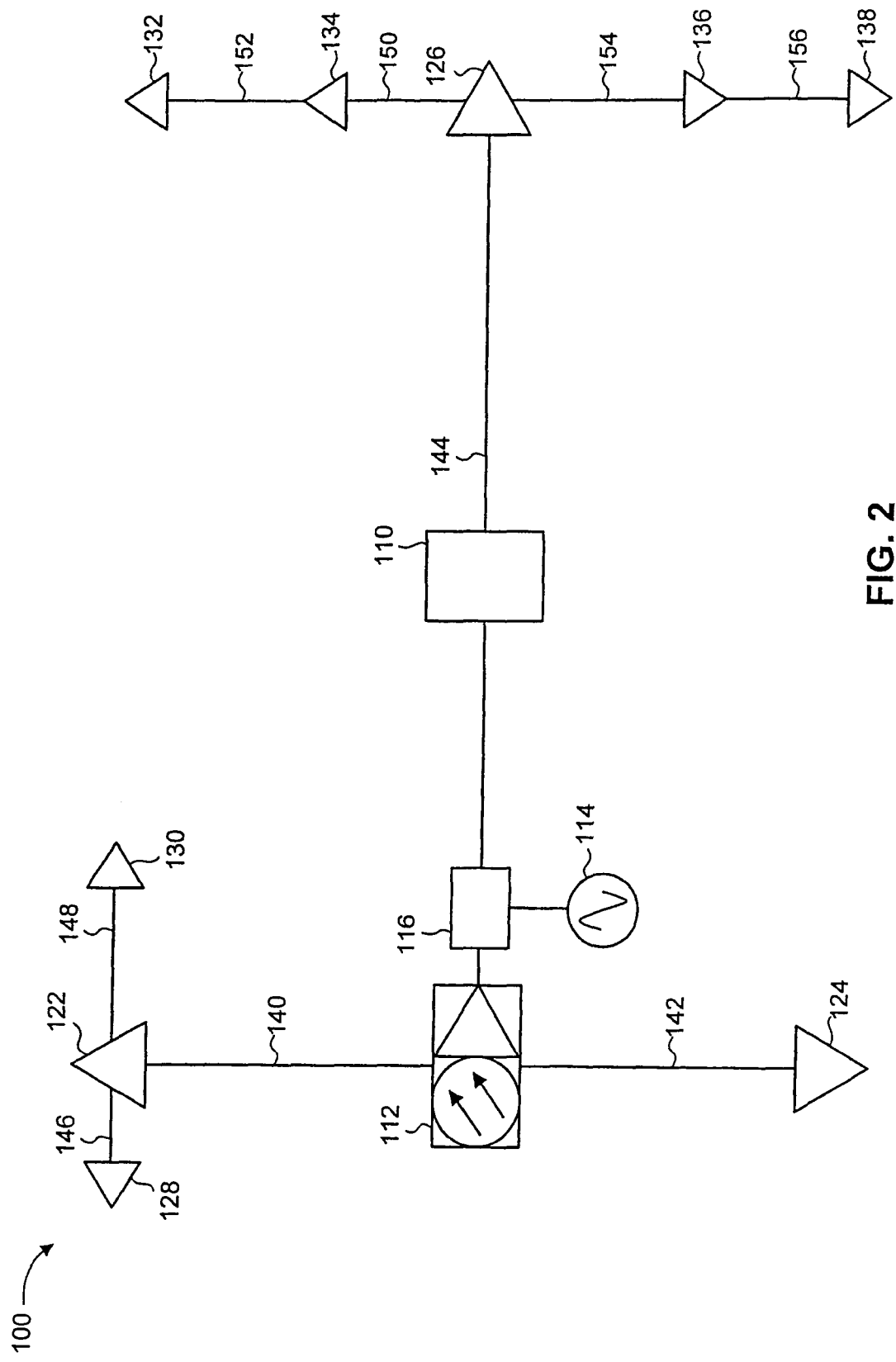
FIG. 2 is a schematic illustration of an HFC network infrastructure with a voltage regulation device, constructed and operative in accordance with an embodiment of the disclosed technique.

Reference is now made to FIG. 2, which is a schematic illustration of an HFC network infrastructure, generally referenced 100, with a voltage regulation device, generally referenced 110, constructed and operative in accordance with an embodiment of the disclosed technique. HFC network infrastructure 100 includes an optical node 112, a power source 114, a power inserter 116, a plurality of trunk amplifiers 122, 124 and 126, and a plurality of line extenders 128, 130, 132, 134, 136 and 138. Optical node 112 is connected to trunk amplifiers 122, 124 and 126 via coaxial cables 140, 142 and 144, respectively. Trunk amplifier 124 is connected to line extenders 128 and 130 via respective coaxial cables 146 and 148. Trunk amplifier 126 is connected via coaxial cable 150 to line extender 134, which is connected to line extender 132 via coaxial cable 152. Trunk amplifier 126 is connected via coaxial cable 154 to line extender 136, which is connected to line extender 138 via coaxial cable 156. Power source 114 provides power via power inserter 116 through coaxial cable 144, supplying optical node 112, trunk amplifiers 122 and 124, and line extenders 128 and 130 with sufficient power to operate. Voltage regulation device 110 is connected to coaxial cable 144 approximately midway between optical node 112 and trunk amplifier 126. Voltage regulation device 110 serves to compensate for the large voltage drop along coaxial cable 144 (due to high resistance and low efficiency of the cable), providing sufficient power for the operation of trunk amplifier 126 and line extenders 132, 134, 136 and 138, all of which are distant from power source 114.

Figure 3:
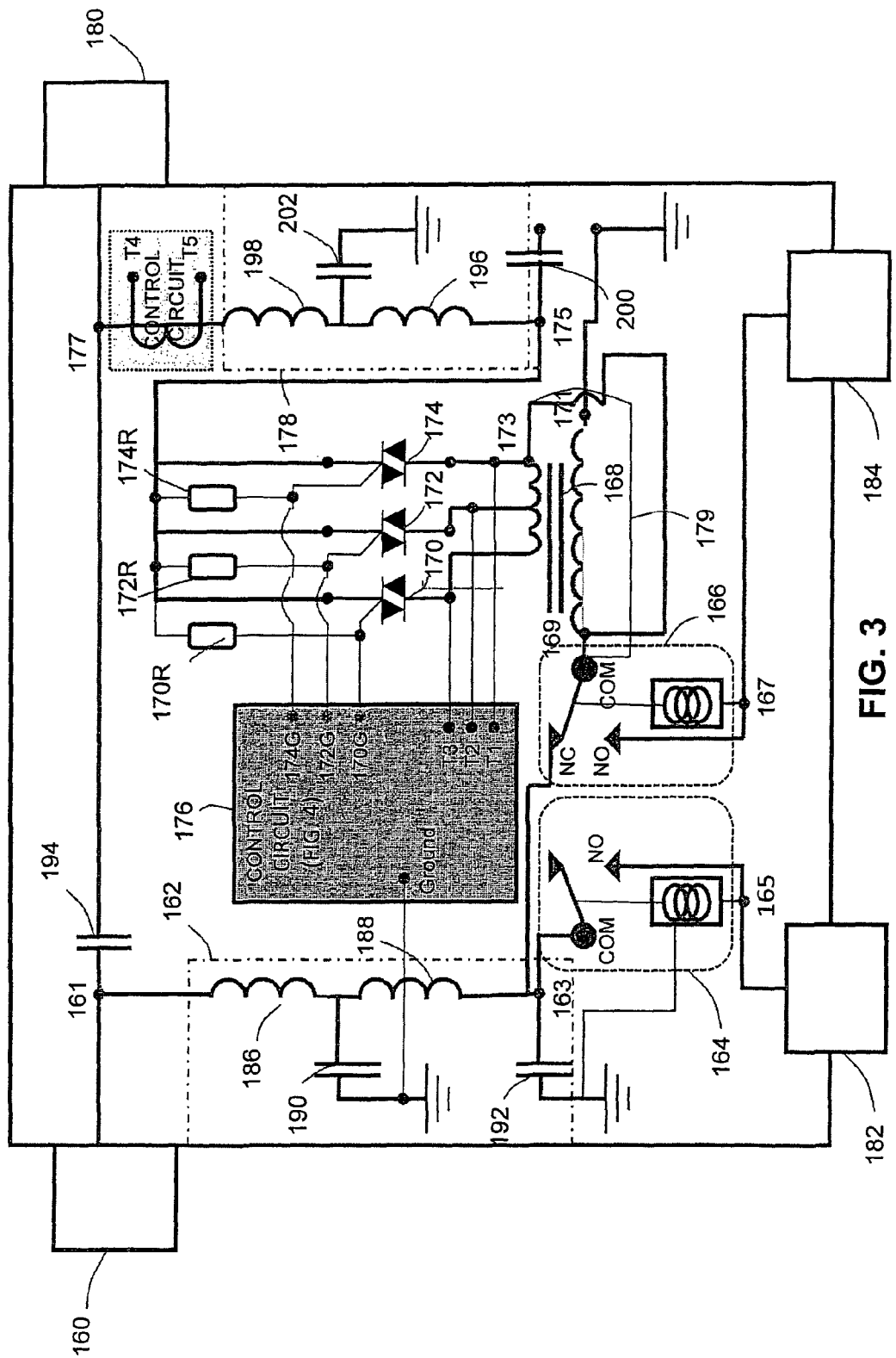
FIG. 3 is a schematic illustration of a voltage regulation device for regulating the voltage level at a desired section of an HFC network, constructed and operative in accordance with an embodiment of the disclosed technique.

Reference is now made to FIG. 3, which is a schematic illustration of a voltage regulation device (110) for regulating the voltage level at a desired section of an HFC network, constructed and operative in accordance with an embodiment of the disclosed technique. Voltage regulation device 110 includes an input port 160, isolating circuitry 162, a pair of relays 164 and 166, a step-up transformer 168, a plurality of solid state relays (SSRs) 170, 172 and 174, control circuitry 176, recombining circuitry 178, an output port 180, and two additional input ports 182 and 184. Input port 160 is connected to a portion of coaxial cable line 144 (FIG. 2) facing optical node 112 (FIG. 2). Isolating circuitry 162 is connected to input port 160 (at node 161) and further connected to relays 164 and 166 (at node 163). Isolating circuitry 162 includes a pair of inductors 186 and 188 connected in series (between nodes 161 and 163), a pair of capacitors 190 and 192 connected in parallel, and an additional capacitor 194 connected between nodes 161 and 177. The common (COM) port of relay 166 is connected to the primary winding (phase-input port) of transformer 168 (at node 169), and further connected to the secondary winding (zero-input port) of transformer 168 (at node 173). The other port of the primary winding of transformer 168 is connected to ground (at node 171). Jumper cable 179 connects the secondary winding (phase-output port) of transformer 168 (at node 173) to the primary winding (phase-input port) of transformer 169 (at node 169). The respective inputs of SSRs 170, 172 and 174 are connected to respective points of the secondary winding of transformer 168. The outputs of SSRs 170, 172 and 174 are all connected at node 177. Control circuitry 176 is connected to the inputs and gates of SSRs 170, 172 and 174, and further connected to ground. Recombining circuitry 178 is connected to SSRs 170, 172 and 174, and further connected to output port 180. Recombining circuitry 178 includes a pair of inductors 196 and 198 connected in series (between nodes 175 and 177), and a pair of capacitors 200 and 202. Output port 180 is connected to a portion of coaxial cable line 144 (FIG. 2) facing trunk amplifier 126 (FIG. 2).

Input port 160 receives an RF telecommunications signal and an AC voltage from coaxial cable 144 (FIG. 2). The AC voltage is generally at a level of 32-60V (in a 60V network) or 32V-90V (in a 90V network) 50/60 Hz Capacitor 194 conveys the RF telecommunications signal (from node 161 toward node 177) while isolating the AC voltage. Inductors 186 and 188 convey the AC voltage (from node 161 toward node 163) while isolating the RF telecommunications signal. Capacitor 190 reduces the portion of the RF telecommunications signal passing through inductor 186, and capacitor 192 reduces the remaining portion of the RF telecommunications signal passing through inductor 188 (at node 163).

Figure 4:
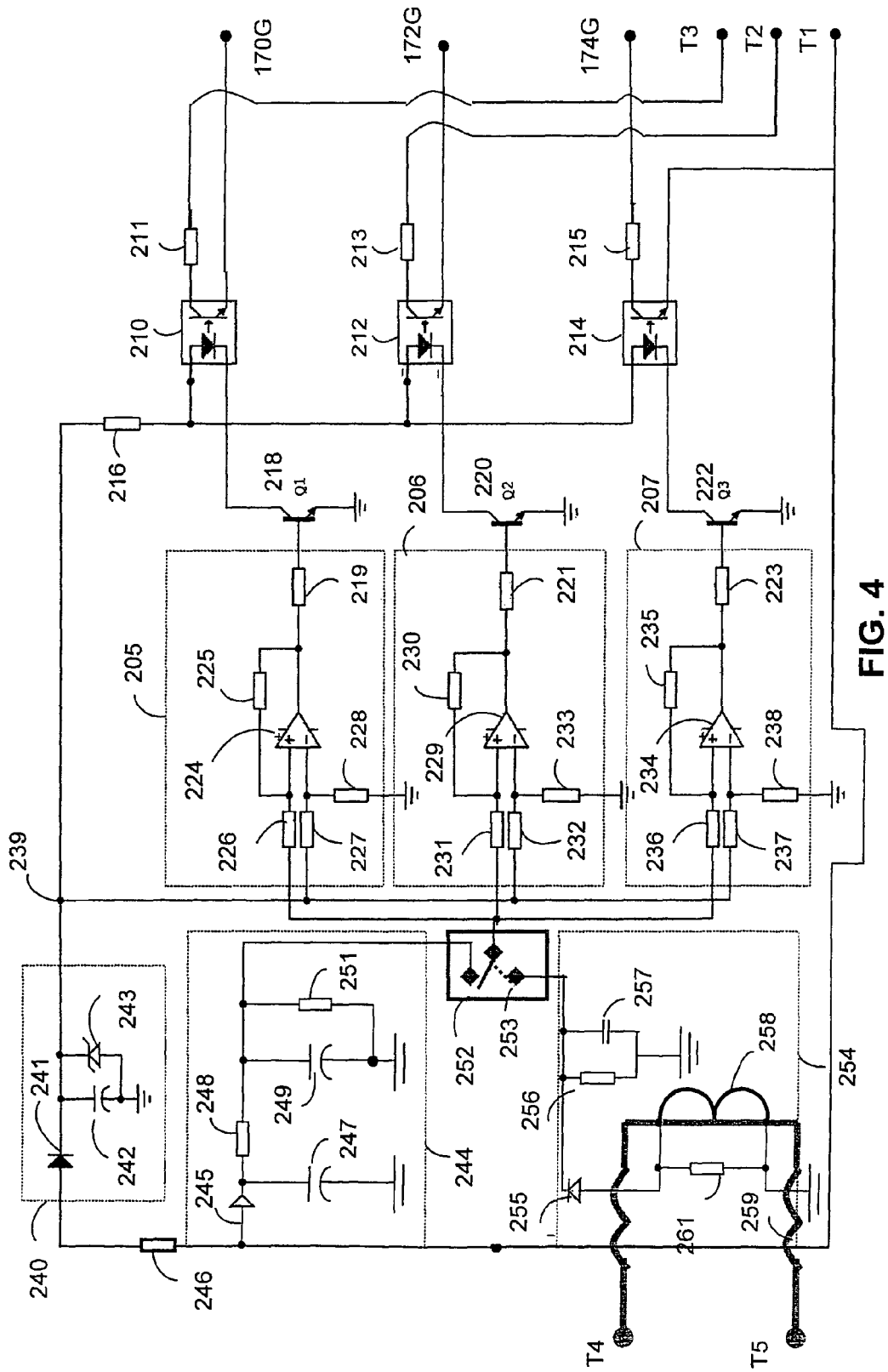
FIG. 4 is a schematic illustration of the control circuit in the voltage regulation device of FIG. 3.

The isolated AC voltage is applied to one of the ports of relay 164 and to the normally closed (NC) port of relay 166, and reaches the phase-input port of transformer 168. Transformer 168 boosts the isolated AC voltage, which is output through one of SSRs 170, 172 and 174 at node 177. SSRs 170, 172 and 174 determine the voltage gain of the boosted AC voltage. In particular, SSR 174, which operates as a first switch of the secondary winding of transformer 168, provides a voltage gain of $V_{in}$; SSR 172, which operates as a second switch of the secondary winding of transformer 168, provides a voltage gain of $V_{in}+V_{switch2}$; and SSR 170, which operates as a third switch of the secondary winding of transformer 168, provides a voltage gain of $V_{in}+V_{switch3}$. During operation, only one of SSRs 170, 172 and 174 is switched "ON" (i.e., form a connection from the input to the output) at a given time, while the remainder are switched "OFF". Control circuitry 176 serves to alternately switch on a selected SSR, while maintaining the other SSRs switched off, in accordance with the desired voltage gain. Control circuitry 176 supplies operating voltage at the gate of the selected SSR, balancing the voltage level for respective SSRs 170, 172 and 174 through the respective resistors 170R, 172R and 174R to switch the SSR on or off. Control circuitry 176 performs precise synchronization of the switching between the SSRs, to produce a stable continuous output voltage at the desired gain. The operation of control circuitry 176 will be elaborated upon herein below (FIG. 4).

It is noted that SSRs 170, 172 and 174 are preferably bidirectional triode thyristors (TRIACs), although equivalent components may also be used, such as silicon-controlled rectifiers (SCRs) (e.g., a pair of SCRs may function as a single TRIAC), transistors, or others switching means. Further alternatively, electro-mechanical relays may be used instead of solid state relays. It is noted that the use of SSRs as the switching elements in voltage regulation device 110 minimizes the switching delay. In particular, the switching may be performed at the zero point of the sinusoidal AC voltage waveform, allowing very precise synchronization between the activation of one SSR and deactivation of another, thereby ensuring that the output voltage is stable and continuous. It is critical that only one SSR is switched on at any given instant in voltage regulation device 110. In addition, since the switching is electronic rather than mechanical (e.g., as with an electro-mechanical relay), there is no mechanical deterioration of the SSR, and it is therefore quite reliable.

Voltage regulation device 110 may include any number of SSRs (i.e., two or more) for providing different ranges of potential voltage gains, accordingly. For example, if the desired regulated output voltage is 60V and three SSRs are used, then a first SSR provides a voltage gain ratio of 1:1 for input voltages between the ranges of approximately 55-65V; a second SSR provides a voltage gain ratio of 1:1.2 for input voltages between the ranges of approximately 50-55V; while a third SSR provides a voltage gain ratio of 1:1.32 for input voltages lower than approximately 50V. A finer sequence of voltage gain ratios/input voltage ranges may be implemented if additional SSRs are added to voltage regulation device 110.

It is noted that the configuration of step-up transformer 168, in which the phase-output (at node 173) is serially connected to the phase-input (at node 169) via jumper cable 179, results in the transformation of only the voltage gain difference (i.e., the amount by which the input voltage is boosted), rather than the entire boosted voltage level. For example, if the initial input voltage is 50V, and an output voltage of 60V is desired, requiring a voltage gain of: (60−50)/50=0.2, then the voltage level at the secondary winding of step-up transformer 168 is only the boosted voltage difference (0.2×50=10V), which is then added to the input voltage (50V) to produce the final regulated voltage (60V). As a result, transformer 168 provides for greater efficiency and enables a smaller and lighter weight transformer to be utilized. Alternatively, a typical transformer configuration (with multiple secondary winding outputs) may be used.

The gained AC voltage is conveyed from node 175 toward node 177 through inductors 196 and 198, where it is recombined with the original RF telecommunications signal. The recombined RF telecommunications signal and gained AC voltage are then retransmitted along coaxial cable 144 (FIG. 2) via output port 180, where the gained voltage supplies sufficient operating power for the necessary network components. Inductors 196 and 198 and capacitors 200 and 202 serve to ensure that no RF signal noise from SSRs 170, 172, 174 or from other elements in device 110 will reach node 177 and be passed on through output port 180 along the coaxial cable network.

Reference is now made to FIG. 4, which is a schematic illustration of the control circuitry 176 in the voltage regulation device 110 of FIG. 3. Control circuitry 176 includes a plurality of phototransistors 210, 212 and 214, a plurality of transistors 218, 220 and 222, a plurality of comparator circuits 205, 206 and 207, a first voltage leveling circuit 240, a manual switch 252, a second voltage leveling circuit 244, and a current transformer voltage leveling circuit 254. Control circuitry 176 is connected to the inputs of SSRs 170, 172 and 174 at connection points T1, T2 and T3, respectively. Control circuitry 176 is further connected to the outputs of SSRs 170, 172 and 174 at connection points 170G, 172G and 174G, respectively. Control circuitry 176 is further connected to input port 160 at connection points T4 and T5.

Phototransistor 210 is connected to connection point T3 through resistor 211, further connected to connection point 170G, further connected to node 239 through resistor 216, and further connected to transistor 218. Phototransistor 212 is connected to connection point T2 through resistor 213, further connected to connection point 172G, further connected to node 239 through resistor 216, and further connected to transistor 220. Phototransistor 214 is connected to connection point T1 through resistor 215, further connected to connection point 174G, further connected to node 239 through resistor 216, and further connected to transistor 222.

Comparator circuit 205 is connected to transistor 218 and to node 239. Comparator circuit 205 includes comparator 224 and resistors 219, 225, 226, 227 and 228. Comparator circuit 206 is connected to transistor 220 and to node 239. Comparator circuit 206 includes comparator 229 and resistors 221, 230, 231, 232 and 233. Comparator circuit 207 is connected to transistor 222 and to node 239. Comparator circuit 207 includes comparator 234 and resistors 223, 235, 236, 237 and 238.

DC voltage equalizing circuit 240 is connected to node 239 and further connected to input voltage leveling circuit 244 through resistor 246. DC voltage equalizing circuit 240 includes a diode 241, a capacitor 242 and a Zener diode 243. Manual switch 252 is connected to input voltage leveling circuit 244, further connected to current transformer voltage leveling circuit 254, and further connected to comparator circuits 205, 206 and 207. Input voltage leveling circuit 244 includes a diode 245, resistors 248 and 251, and capacitors 247 and 249. Current transformer voltage leveling circuit 254 includes a diode 255, a resistor 256, a capacitor 257 and a current transformer 258. The winding of current transformer 258 is connected to connection points T4 and T5.

Control circuitry 176 is operative to activate the appropriate SSR and deactivate the remaining SSRs, based on the level of the input voltage. Control circuitry 176 monitors the input voltage level (at connection point T1) and intermittently switches on and off SSRs 170, 172 and 174 such that the output voltage from transformer 168 is at the desired level (e.g., 60V). An additional function of control circuitry 176 is to prevent a current overload at the output. Control circuitry 176 monitors the output current with current transformer 258, and if it is above a threshold level, directs voltage regulation device 110 to increase the output voltage level. Control unit 176 may determine which operation to perform (i.e., voltage regulation or current overload prevention) based on the monitored input voltage. Alternatively, manual switch 252 may be used to select the operation of control circuitry 176.

Voltage leveling circuit 240 provides a constant voltage level at node 239. Voltage leveling circuit 244 provides a reference voltage at node 253 based on the input voltage level. Comparator circuit 205 has a reference voltage determined by the ratio of resistors 227 and 228. Similarly, comparator circuit 206 has a reference voltage determined by the ratio of resistors 232 and 233, and comparator circuit 207 has a reference voltage determined by the ratio of resistors 237 and 238. If the reference voltage at a particular comparator circuit is less than the reference voltage at node 239, then that comparator circuit is switched on, activating the respective transistor 218, 220, 222 and respective phototransistor 210, 212, 214, while the other comparator circuits are kept switched off. For example, if the input voltage level is above a first threshold level (e.g., 55V), then SSR 174, which provides no voltage gain (i.e., a voltage gain ratio of 1:1) is kept switched on, while SSRs 170 and 172 are kept switched off, which is also typically the default state of voltage regulation device. In this state, comparator circuit 207 activates transistor 222 and phototransistor 214, thereby forming a closed connection through SSR 174 from the transformer 168. When the input voltage level drops below the first threshold level but is above a second threshold level (e.g., between 50-55V), then SSR 172, which provides a voltage gain of 20% (i.e., a voltage gain ratio of 1:1.2) is switched on, while SSRs 170 and 174 are kept switched off. In this state, comparator circuit 206 activates transistor 220 and phototransistor 212, thereby forming a closed connection through SSR 172 from the transformer 168. When the input voltage level drops below the second threshold level (e.g., below 50V), then SSR 170, which provides a voltage gain of 32% (i.e., a voltage gain ratio of 1:1.32) is switched on, while SSRs 172 and 174 are kept switched off. In this state, comparator circuit 205-activates transistor 218 and phototransistor 210, thereby forming a closed connection through SSR 170 from the transformer 168.

Manual switch 252 includes a first mode for operation based on sampling the input voltage, and a second mode for operation based on sampling the voltage level from current transformer 258. In both cases, control circuitry 176 operates as described above, the difference being that in the first mode the reference voltage is based on the input voltage level whereas in the second mode the reference voltage is based on the output current level. In particular, current transformer voltage leveling circuit 254 provides a DC voltage based on the current level through current transformer 258, and based on the voltage level, the appropriate comparator circuit is switched on, activating the respective transistor 218, 220, 222 and respective phototransistor 210, 212, 214, while the other comparator circuits are kept switched off. In the first mode of operation, the voltage gain of voltage regulation device 110 increases inversely in proportion to the sampled input voltage level, whereas in the second mode of operation, the voltage gain increases in proportion to the sampled output current. Since the total energy consumption is constant, the increase of voltage entails a decrease of current, thereby preventing the occurrence of a current overload.

Referring back to FIG. 2, the configuration of HFC network 100 is particularly suitable for overcoming a substantially large voltage drop across coaxial cable 144, due to high resistance or high current, such as when the voltage level at the input of trunk amplifier 126 is less than approximately 70-80% of the original voltage level (typically 60 Vac). The configuration of HFC network 100 generally provides a regulated voltage level for a maximum distance along coaxial cable 144.

Figure 5:
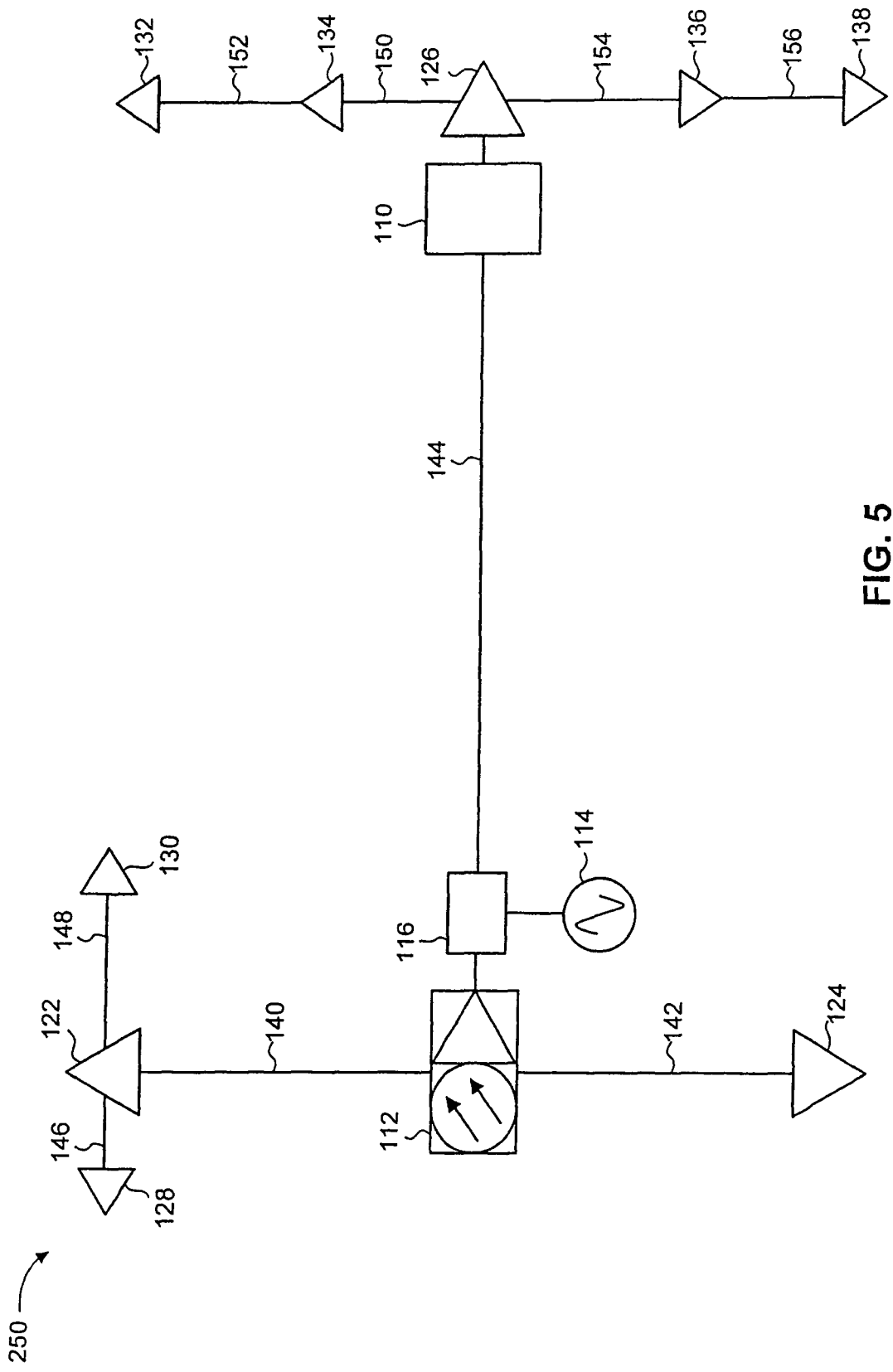
FIG. 5 is a schematic illustration of an HFC network infrastructure with a voltage regulation device in a second configuration, constructed and operative in accordance with another embodiment of the disclosed technique.

Reference is now made to FIG. 5, which is a schematic illustration of an HFC network infrastructure, generally referenced 250, with a voltage regulation device 110 in a second configuration, constructed and operative in accordance with another embodiment of the disclosed technique. HFC network infrastructure 250 is analogous to HFC network infrastructure 100 (FIG. 2) with the exception that voltage regulation device 100 is connected directly to trunk amplifier 126, rather than being connected to coaxial cable 144 approximately midway between optical node 112 and trunk amplifier 126. In particular, the input port 160 (FIG. 3) of voltage regulation device is connected to coaxial cable 144 (where it receives the input RF telecommunications and AC voltage), while the output port 180 (FIG. 3) of voltage regulation device 110 is connected to an input port of trunk amplifier 126. The configuration of HFC network 250 is particularly suitable when the voltage level at the input of trunk amplifier 126 is greater than approximately 70% of the original voltage level, such as if a long cascade of line extenders are connected to the branches of trunk amplifiers.

Figure 6:
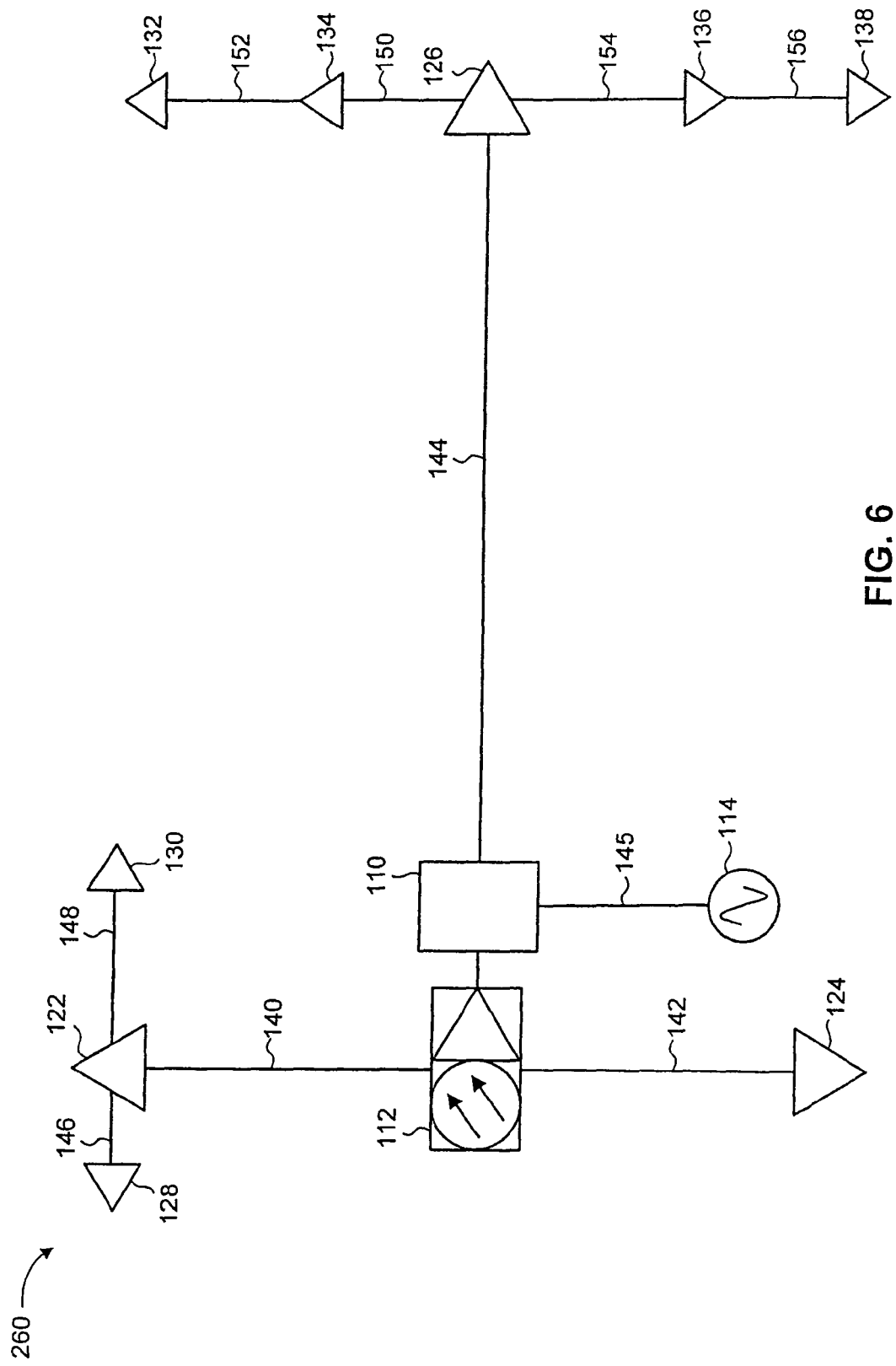
FIG. 6 is a schematic illustration of an HFC network infrastructure with a voltage regulation device in a third configuration, constructed and operative in accordance with a further embodiment of the disclosed technique.

Reference is now made to FIG. 6, which is a schematic illustration of an HFC network infrastructure, generally referenced 260, with a voltage regulation device 110 in a third configuration, constructed and operative in accordance with a further embodiment of the disclosed technique. HFC network infrastructure 260 is analogous to HFC network infrastructure 100 (FIG. 2) with the exception that voltage regulation device 100 is connected directly to optical node 112, replacing power inserter 116. In particular, an input port 182 (FIG. 3) of voltage regulation device 110 is connected to power source 114 (via coaxial cable 145), while input port 160 (FIG. 3) of voltage regulation device 110 is connected to an output port of optical node 112, and output port 180 (FIG. 3) of voltage regulation device 110 is connected to coaxial cable 144. The configuration of HFC network 260 is particularly suitable when power source 114 is distant from coaxial cable 144, resulting in a significant voltage drop (e.g., greater than 10% of the initial voltage level supplied by power source 114) over coaxial cable 145. Voltage regulation device 110 supplies (a non-regulated) voltage via input port 160 from power source 114 for the operation of optical node 112, trunk amplifiers 122 and 124, and line extenders 128 and 130, while supplying a regulated voltage via output port 180 for the operation of trunk amplifier 126 and line extenders 132, 134, 136 and 138. Referring back to FIG. 3, when the voltage level at nodes 165 and 167 are below a threshold level (e.g., 45V), then relays 164 and 166 are switched "OFF". When a power source is connected to input port 182, however, such as in the configuration of HFC network infrastructure 260, then relay 164 switches "ON". Subsequently, the AC voltage from port 182 is conveyed through relay 164 from node 165 to node 163, and through inductors 188 and 186 from node 163 to node 161, where the AC voltage is combined with the RF telecommunications signal received at input port 160 (from optical node 112). The non-regulated AC voltage exits port 130 and supplies optical node 112, trunk amplifiers 122 and 124, and line extenders 128 and 130 with operating power. From node 163, the non-regulated AC voltage continues toward transformer 168, where it undergoes boosting at a particular voltage gain, and then recombined with the RF telecommunications signal at node 177, as described hereinabove. The recombined signal (with the regulated voltage) is output via output port 180 and supplies trunk amplifier 126 and line extenders 132, 134, 136 and 138 with sufficient operating power. The configuration of HFC network 260 also provides a reduced current level throughout the network, by increasing the voltage level feeding coaxial cable 144 to an optimum level.

Figure 1A:
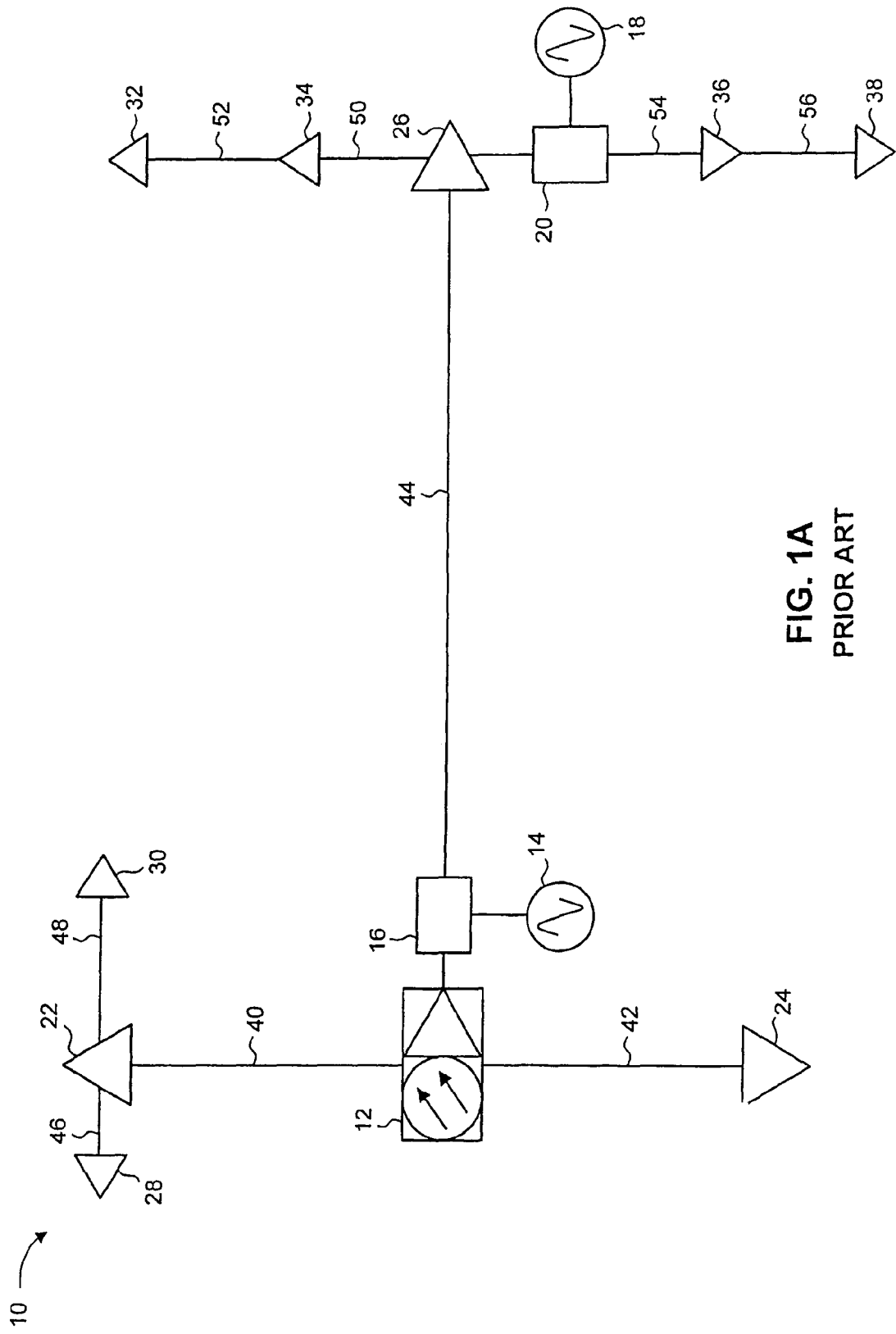
FIG. 1A is a schematic illustration of a hybrid fiber-coaxial (HFC) network infrastructure, which is known in the art.
Figure 1B:
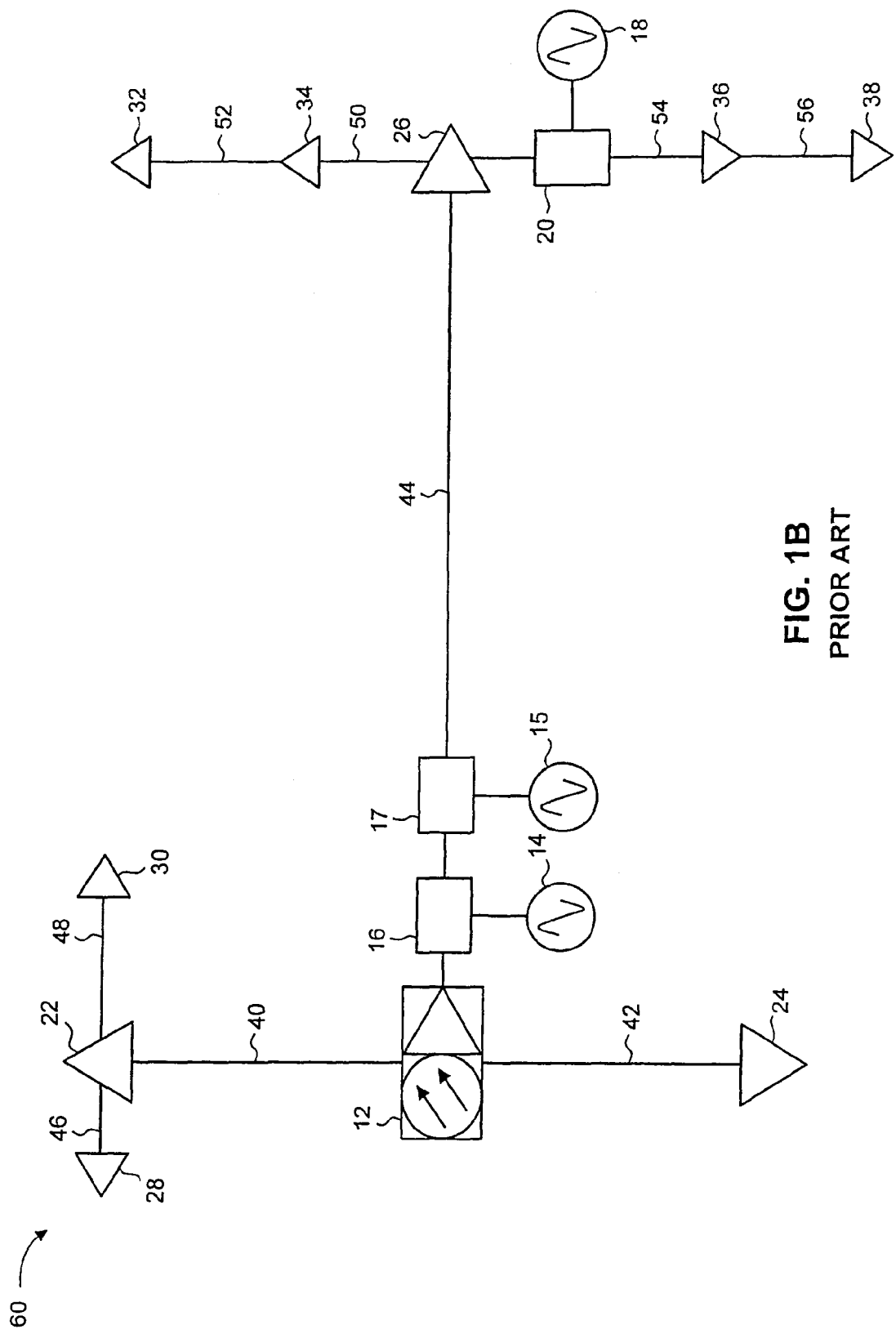
FIG. 1B is a schematic illustration of another HFC network infrastructure, which is known in the art.
Figure 7:
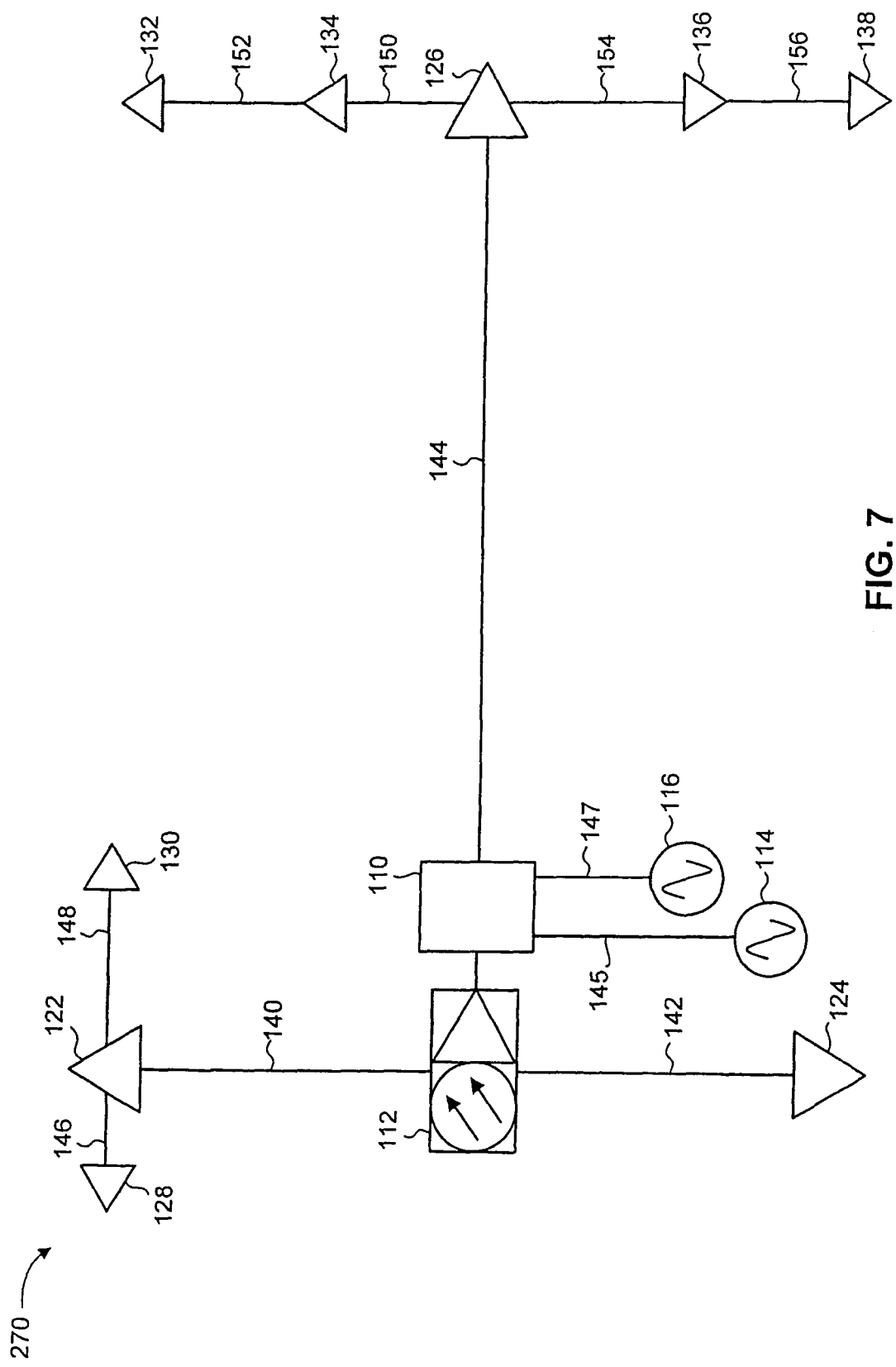
FIG. 7 is a schematic illustration of an HFC network infrastructure with a voltage regulation device in a fourth configuration, constructed and operative in accordance with yet another embodiment of the disclosed technique.

Reference is now made to FIG. 7, which is a schematic illustration of an HFC network infrastructure, generally referenced 270, with a voltage regulation device 110 in a fourth configuration, constructed and operative in accordance with yet another embodiment of the disclosed technique. HFC network infrastructure 270 is analogous to HFC network infrastructure 260 (FIG. 6) with an additional power source 116 connected to voltage regulation device 110 (via cable 147). In particular, input port 182 (FIG. 3) of voltage regulation device 110 is connected to power source 114, input port 184 (FIG. 3) of voltage regulation device 110 is connected to power source 116, input port 160 (FIG. 3) of voltage regulation device 110 is connected to an output port of optical node 112, and output port 180 (FIG. 3) of voltage regulation device 110 is connected to coaxial cable 144. The configuration of HFC network 270 is particularly suitable when power sources 114 and 116 are distant from coaxial cable 144, resulting in a significant voltage drop over coaxial cable 145 and 147 (as with the scenario outlined in HFC network infrastructure 260), and when two power sources in close proximity are needed for supplying sufficient power to the required loads (as in HFC network infrastructure 60 of FIG. 1B). Referring back to FIG. 3, when power sources are connected to input ports 182 and 184, respectively, such as in the configuration of HFC network infrastructure 270, the voltage level at each of nodes 165 and 167 surpasses the threshold level, and relays 164 and 166 are both switched "ON". The AC voltage from port 182 is conveyed through relay 164 from node 165 to node 163, and through inductors 188 and 186 from node 163 to node 161, where the AC voltage is combined with the RF telecommunications signal received at input port 160 (from optical node 112). The non-regulated AC voltage exits port 160 and supplies optical node 112, trunk amplifiers 122 and 124, and line extenders 128 and 130 with operating power. The AC voltage from port 184 is conveyed through relay 166 from node 167 to node 169, and is then boosted by transformer 168 at a particular voltage gain (depending on which SSR is switched ON at that instant), and then recombined with the RF telecommunications signal at node 177, as described hereinabove. The recombined signal (with the regulated voltage) is output via output port 180 and supplies trunk amplifier 126 and line extenders 132, 134, 136 and 138 with the required voltage level (e.g., approximately 60V in a 60V network, or approximately 90V in a 90V network). The configuration of HFC network 270 also provides a reduced current level throughout the network, while compensating for the voltage drop across coaxial cables 145 and 147 and eliminating the need for power inserters.

Figure 8:
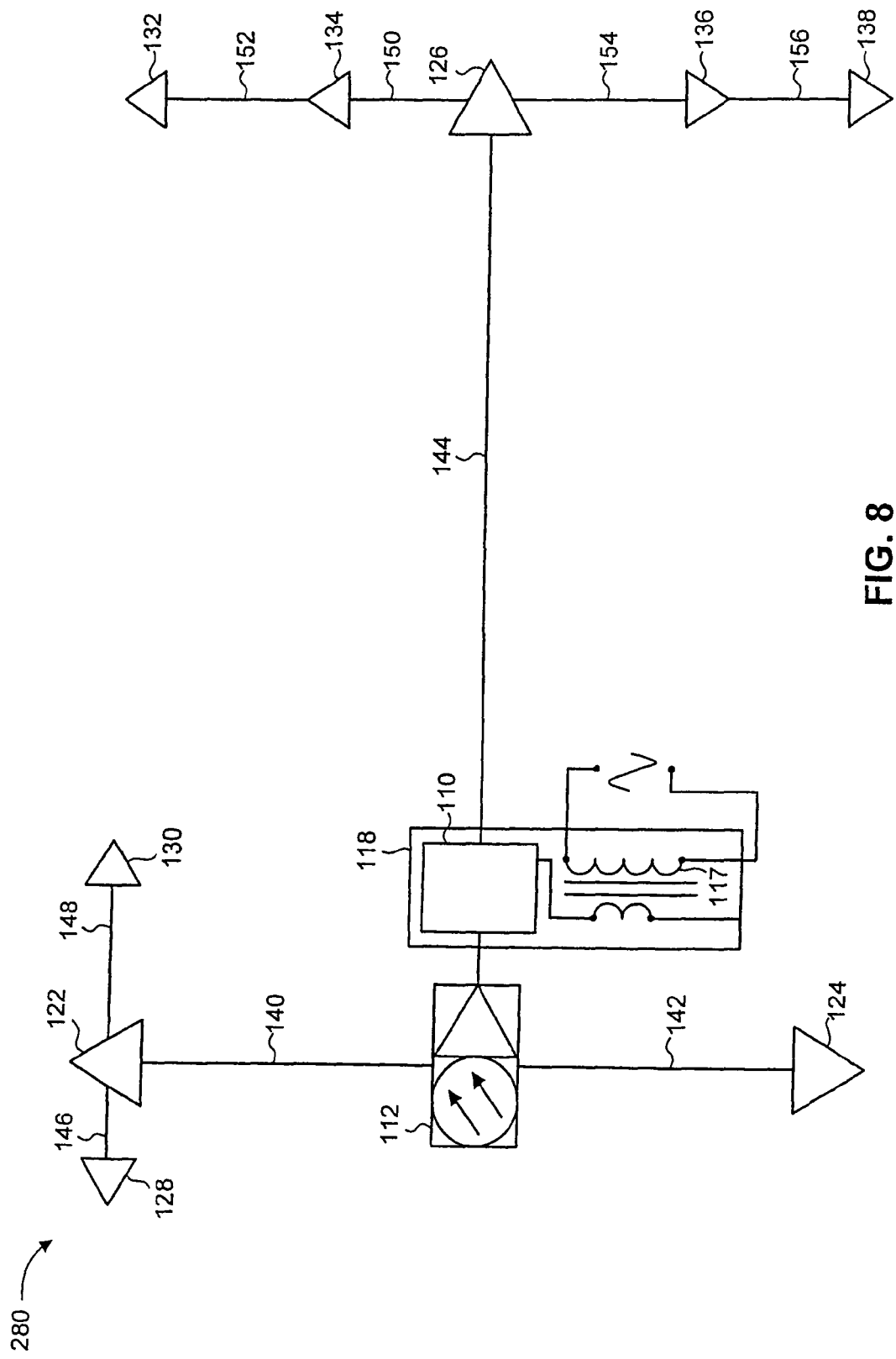
FIG. 8 is a schematic illustration of an HFC network infrastructure with a voltage regulation device combined with a transformer, constructed and operative in accordance with yet a further embodiment of the disclosed technique.

Reference is now made to FIG. 8, which is a schematic illustration of an HFC network infrastructure, generally referenced 280, with a voltage regulation device 110 combined with a transformer 117, constructed and operative in accordance with yet a further embodiment of the disclosed technique. HFC network infrastructure 280 is analogous to HFC network infrastructure 260 (FIG. 6) with the exception that voltage regulation device 110 is connected to a standard industrial transformer 117 in a single housing 118, which replaces both the power source 114 and power inserter 116 (FIG. 2). Transformer 117 receives power from the utility power network. In the configuration of HFC network infrastructure 280, the combination of voltage regulation device 110 and transformer 117 functions as a customized power supply with a regulated voltage output, replacing a standard ferroresonant power supply while providing a sinusoidal voltage without harmonics or transients.

It is noted that the disclosed technique is described herein with respect to a hybrid fiber-coaxial (HFC) network, such as those used in cable television (CATV) network infrastructures, although it is appreciated that it is also applicable to other types of telecommunications networks. The disclosed technique is further applicable to other industrial applications. For example, voltage regulation device 110 may be utilized for recovering the original voltage level at the end of a power line in a remote telecommunications access cabin.

Figure 9:
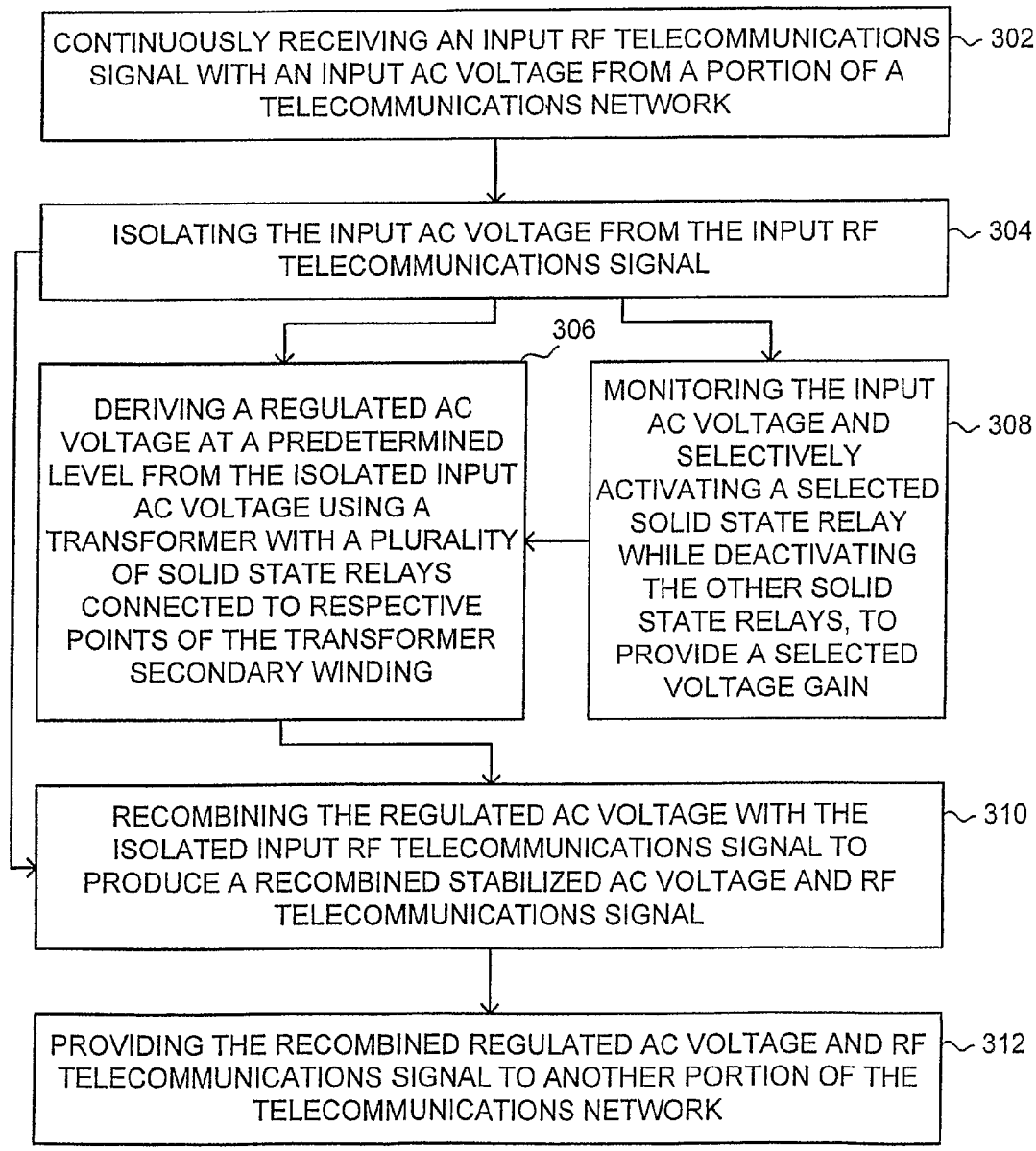
FIG. 9 is a block diagram of a method for regulating the voltage level at a desired section of an HFC network, operative in accordance with an embodiment of the disclosed technique.

Reference is now made to FIG. 9, which is a block diagram of a method for regulating the voltage level at a desired section of an HFC network, operative in accordance with an embodiment of the disclosed technique. In procedure 302, an input RF telecommunications signal with an input AC voltage is continuously received from a portion of a coaxial cable in a telecommunications network. With reference to FIGS. 2 and 3, input port 160 of voltage regulation device 110 receives an RF telecommunications signal and an AC voltage from coaxial cable 144.

In procedure 304, the input AC voltage is isolated from the input RF telecommunications signal. With reference to FIG. 3, isolating circuitry 162 of voltage regulation device 110 isolates the AC voltage from the RF telecommunications signal, using inductors 186 and 188 and capacitors 190 and 192. The AC voltage is isolated from the RF telecommunications signal to ensure minimum insertion loss and interruption of the RF telecommunications signal.

In procedure 306, a regulated AC voltage at a predetermined level is derived from the isolated input AC voltage using a transformer having a plurality of solid state relays connected to respective points of the transformer secondary winding. With reference to FIG. 3, transformer 168 boosts the isolated AC voltage, which is output through one of SSRs 170, 172 and 174 at node 177. Each of SSRs 170, 172 and 174 operates as a respective switch from the transformer secondary winding to provide a respective voltage gain.

In procedure 308, the input AC voltage is monitored and a selected solid state relay is activated while the other solid state relays are deactivated to provide a selected voltage gain. With reference to FIG. 3, control circuitry 176 alternately switches on a selected SSR of SSRs 170, 172 and 174, while maintaining the other SSRs switched off, thereby producing the desired voltage gain to ensure the predetermined output voltage level. For example, SSR 174 may provide a voltage gain ratio of 1:1; SSR 172 may provide a voltage gain ratio of 1:1.2; and SSR 170 may provide a voltage gain ratio of 1:1.32, to ensure that the output voltage level is approximately 60V (or 90V for a 90V network).

In procedure 310, the regulated output voltage is recombined with the isolated input RF telecommunications signal to produce a recombined regulated AC voltage and RF telecommunications signal. With reference to FIG. 3, recombining circuitry 178 of voltage regulation device 110 recombines the regulated AC voltage (output from transformer 168) with the original RF telecommunications signal, using inductors 196 and 198 and capacitors 200 and 202.

In procedure 312, the recombined regulated AC voltage and RF telecommunications signal is provided to another portion of the coaxial cable in the telecommunications network. With reference to FIGS. 2 and 3, output port 180 of voltage regulation device 110 conveys the recombined RF telecommunications signal and regulated AC voltage to coaxial cable 144 for distribution through HFC network infrastructure 110. The regulated AC voltage provides sufficient power for the operation of trunk amplifier 126 and line extenders 132, 134, 136 and 138, compensating for the large voltage drop along coaxial cable 144 from power source 114.

It will be appreciated by persons skilled in the art that the disclosed technique is not limited to what has been particularly shown and described hereinabove.

The invention claimed is:

1. A device for regulating the voltage level at a desired section of a telecommunications network, said device comprising:

an input port, connected to a portion of said network and receiving an input RF telecommunications signal with an input AC voltage;

isolating circuitry, connected with said input port, for isolating said input AC voltage from said input RF telecommunications signal;

a step-up transformer, connected with said isolating circuitry, said transformer comprising a primary winding receiving said isolated input AC voltage and a secondary winding having a phase-output serially connected to the phase-input of said transformer primary winding;

a plurality of relays, connected to respective points of said secondary winding of said transformer, said relays operative for providing a selected voltage gain by selectively switching on a connection from said secondary winding of said transformer, thereby deriving a regulated AC voltage at a predetermined level;

control circuitry, connected with said transformer and with said relays, said control circuitry operative for monitoring said input AC voltage, and selectively activating a selected relay while deactivating the other relays, to provide said selected voltage gain;

recombining circuitry, connected with said relays, for recombining said regulated AC voltage with said isolated input RF telecommunications signal to produce a recombined regulated AC voltage and RF telecommunications signal; and an output port, connected to said recombining circuitry and to another portion of said network, said output port providing said recombined regulated AC voltage and RF telecommunications signal to said another portion of said network.

2. The device of claim 1, wherein said telecommunications network comprises a cable television (CATV) network.

3. The device of claim 1, wherein said regulated AC voltage has a level selected from the group consisting of:
approximately 60V; and
approximately 90V.

4. The device of claim 1, wherein said relays are solid state relays.

5. The device of claim 4, wherein said solid state relays are respectively selected from the group consisting of:
bidirectional triode thyristors (TRIACs);
silicon-controlled rectifiers (SCRs); and
transistors.

6. The device of claim 1, wherein said control circuitry further prevents a current overload at said output port, by monitoring the output current and selectively increasing said regulated AC voltage.

7. The device of claim 1, wherein said input port is connected to a portion of a coaxial cable of said telecommunications network, and said output port is connected to another portion of said coaxial cable.

8. The device of claim 1, wherein at least one of said input port and said output port is connected directly to a network component of said telecommunications network.

9. The device of claim 8, wherein said network component of said telecommunications network is selected from the group consisting of:
an optical node;
a trunk amplifier; and
a power source.

10. The device of claim 1, further comprising a second input port, wherein said second input port receives said input AC voltage directly from a power source, wherein said device supplies non-regulated voltage to a portion of said telecommunications network and supplies regulated voltage to another portion of said telecommunications network.

11. The device of claim 10, further comprising a third input port, wherein said third input port receives further input AC voltage directly from a second power source.

12. The device of claim 1, wherein said device is combined with a further transformer, said transformer receiving voltage from an external power supply, said device operative as a customized power supply with a regulated voltage output for said telecommunications network.

13. A telecommunications network infrastructure comprising a device as claimed in claim 1, for regulating the voltage level at a desired section of said telecommunications network infrastructure.

14. A method for regulating the voltage level at a desired section of a telecommunications network, the method comprising the procedures of:
continuously receiving an input RF telecommunications signal with an input AC voltage from a portion of said network;
isolating said input AC voltage from said input RF telecommunications signal;
deriving a regulated AC voltage at a predetermined level, from said isolated input AC voltage, using a transformer with a plurality of relays connected to respective portions of the transformer secondary winding;
monitoring said input AC voltage, and selectively activating a selected relay while deactivating the other relays, to provide a selected voltage gain;
recombining said regulated AC voltage with said isolated input RF telecommunications signal to produce a recombined regulated AC voltage and RF telecommunications signal;
providing said recombined regulated AC voltage and RF telecommunications signal to another portion of said network, and
providing a procedure of preventing a current overload at an output port, by monitoring the output current and selectively increasing said regulated AC voltage.

15. The method of claim 14, wherein said telecommunications network comprises a CATV network.

16. The method of claim 14, wherein said regulated AC voltage has a level selected from the group consisting of:
approximately 60V; and
approximately 90V.

17. The method of claim 14, wherein said relays are solid state relays.

* * * * *